United States Patent [19]

Sprague et al.

[11] Patent Number: 5,596,500
[45] Date of Patent: Jan. 21, 1997

[54] MAP READING SYSTEM FOR INDICATING A USER'S POSITION ON A PUBLISHED MAP WITH A GLOBAL POSITION SYSTEM RECEIVER AND A DATABASE

[75] Inventors: David S. Sprague, Portola Valley; Arthur N. Woo, Cupertino, both of Calif.

[73] Assignee: Trimble Navigation Limited, Sunnyvale, Calif.

[21] Appl. No.: 363,680

[22] Filed: Dec. 23, 1994

Related U.S. Application Data

[63] Continuation-in-part of Ser. No. 143281, Oct. 25, 1993, Pat. No. 5,422,814.
[51] Int. Cl.$^6$ .................................................. G01S 5/02
[52] U.S. Cl. ...................... 364/449.7; 342/357; 342/457; 364/449.2
[58] Field of Search ........................ 364/449, 460; 342/357, 457, 450, 451; 340/995; 434/150, 153

[56] References Cited

U.S. PATENT DOCUMENTS 5,396,254  3/1995  Toshiyuki ........................... 342/357

*Primary Examiner*—Michael Zanelli
*Attorney, Agent, or Firm*—Law Offices of Thomas E. Schatzel A Prof. Corporation

[57] ABSTRACT

A combination of a GPS receiver for determining a user's position in terms of latitude and longitude, a database that indexes approximately 53,000 USGS 7.5 minute series topographical quadrangle maps by the latitude and longitude of at least one point on each map, and an interpreter and display that communicates the particular USGS map that represents the user's position together with the ruler dimensions left/right/up/down from a reference point on that map which pinpoints the user's position on the map. The database is stored in the permanent memory of the GPS receiver and the interpreter and display are controller by a microcomputer included in the GPS receiver. The reference points include sixteen intersections on the map of 2.5 minute intervals of latitude and longitude contained in each 7.5 minute series quadrangle.

7 Claims, 6 Drawing Sheets

| southeast corner reference | name and state | scale |
|---|---|---|
| 122°00'N, 37°07'30"W | CASTLE ROCK, CA | 1:24,000 |
| — | — | — |
| — | — | — |
| — | — | — |
| — | — | — |
| — | — | — |
| — | — | — |
| — | — | — |

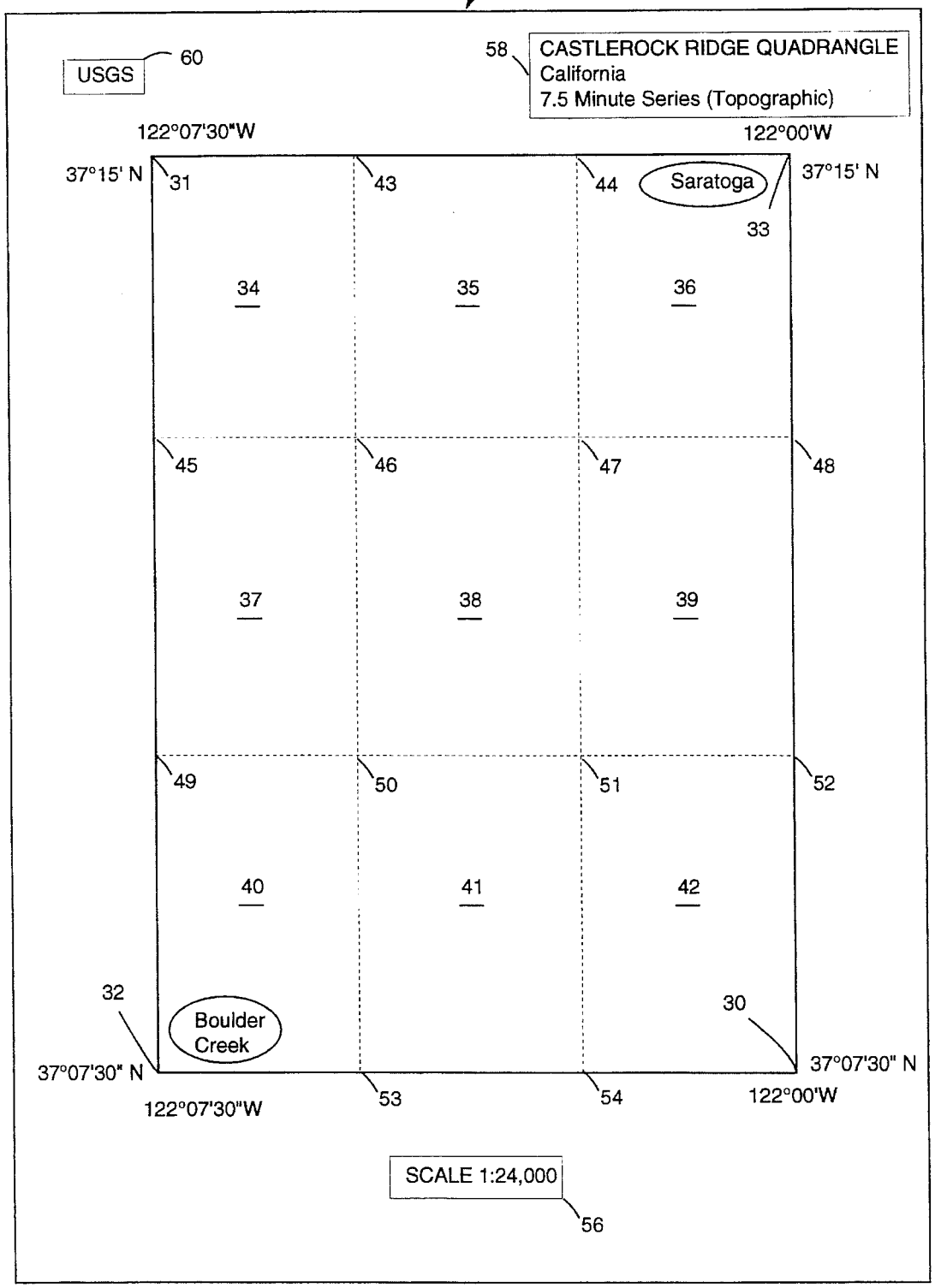

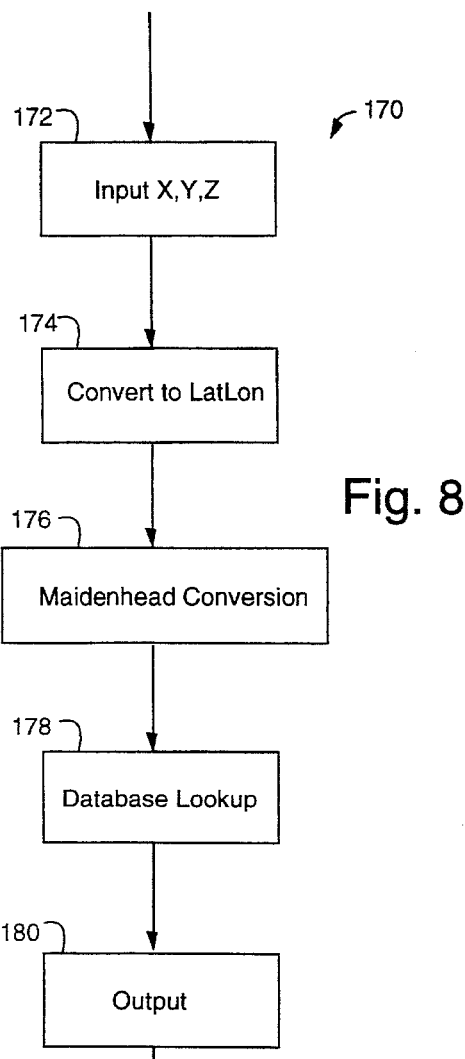
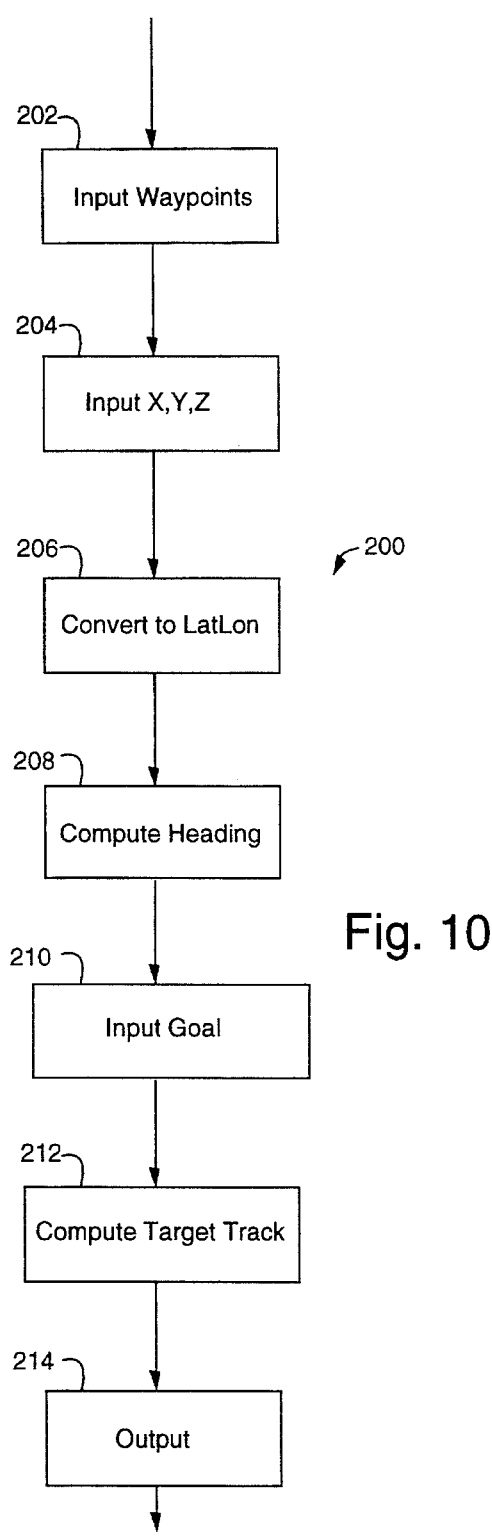
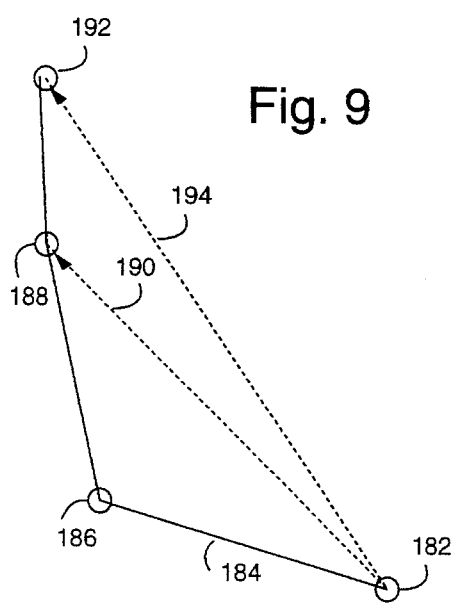
Fig. 8
Fig. 9
Fig. 10

MAP READING SYSTEM FOR INDICATING A USER'S POSITION ON A PUBLISHED MAP WITH A GLOBAL POSITION SYSTEM RECEIVER AND A DATABASE

APPLICATION

This Application is a continuation-in-part of a United States patent application Ser. No. 08/143,281, filed Oct. 25, 1993, now U.S. Pat. No. 5,422,814, by the present inventors, entitled, GLOBAL POSITION SYSTEM RECEIVER WITH MAP COORDINATE SYSTEM OUTPUTS, which Application is incorporated herein by reference.

BACKGROUND OF THE INVENTION

1. Field of the Invention

The invention relates generally to navigation and more specifically to equipment and methods for finding one's position on a map with the aid of a global positioning system receiver.

2. Description of the Prior Art

Global positioning system (GPS) receivers conventionally output position indications in terms of longitude and latitude. Relating that information to a road map, atlas or topographic map has been difficult for lay people, and errors in understanding one's real position relative to a map are frequently made. For example, the United States Geological Survey (USGS) (Denver, Colo.), publishes 7.5 minute series topographical maps that divide the Continental United States into 53,000 quadrangles of 7.5 minutes longitude and 7.5 minutes latitude. Boulder Creek, Calif., is represented on the topographical map uniquely titled, "Castle Rock Ridge Quadrangle, California". The southeast corner of this particular USGS map is identified as being 37°07'30" north latitude and 122°00' west longitude. The northwest corner is also identified, as being 37°15' north latitude and 122°07'30" west longitude. Boulder Creek, Calif., lies at the southwest corner, identified as being 37°07'30" north latitude and 122°07'30" west longitude. Saratoga, Calif. lies near the northeast corner, which is identified as being 37°15' north latitude and 122°00' west longitude. These maps further show 2'30" divisions of latitude and longitude, which divide each quadrangle map sheet into nine parts, a matrix three-by-three. The map scale is 1:24,000, meaning one inch represents 24,000 inches on land, or 2,000 feet.

It is possible therefore, to manually figure out which spot on a particular USGS map represents a users position as originally determined in terms of latitude and longitude from a conventional GPS receiver display.

A conventional GPS receiver with the ability to communicate the desired heading to a user is described by Isaac N. Duraboraw, III, in U.S. Pat. No. 5,266,958, issued Nov. 30, 1993, which is incorporated herein by reference. A simple indication of the direction of the desired heading is indicated during the user's swinging of the GPS receiver in a horizontal circle. A visual or audible alert tells the user which part of the circle lies in the direction of the desired heading.

The GPS is a satellite-based radio-navigation system from which extremely accurate time and navigational information can be computed. A user's three-dimensional position and velocity can be computed for any point on or near earth. The GPS several satellites evenly dispersed in three, inclined, 12-hour circular orbits chosen to insure continuous 24-hour coverage worldwide. Each satellite carries extremely accurate cesium and rubidium vapor atomic clocks providing timing information. Additionally, each satellite is provided with clock correction and orbital information by earth-based monitoring stations.

Topographical map users need a quick and easy method to determine and record their precise position on any topographical (TOPO) series map. Such maps have a datum located somewhere on the map itself, such as at a bottom right corner, e.g., the south east corner, that provides the latitude and longitude at that point. The map further provides a scale factor that can be used to convert, for example, inches on the map to miles over the terrain. Users could benefit from a system that could provide position information in any one of several different formats, starting from four inputs consisting of a datum input, a scale factor, and the horizontal and vertical distances on the map from the datum. A GPS receiver that provided current position information from a user selected reference point, such as the south-east datum of a map page, would be useful if inches "over and up" from the datum were displayed on the GPS receiver's screen.

Besides the longitude-latitude format, other formats for position identification include universal transverse mercader (UTM), Maidenhead, TRIMBLE GRID LOCATOR™, OSGB and Thomas Brothers™ Maps. Maidenhead is a system used by the world's amateur radio operators to describe locations in alternating sequences of two letters followed by two digit numbers. Each pair adds precision to the position description, and Maidenhead coordinates can be readily communicated over radio channels, even when the reception is poor. TRIMBLE GRID LOCATOR (TGL) is a proprietary map coordinate system marketed by Trimble Navigation (Sunnyvale, Calif.) for use with GPS receivers. The TRIMBLE ATLAS is based upon the North American Datum, 1983 (NAD 83).

A regional map of the United States is provided in atlas form for the TGL system and provides a regional map scale of one inch to thirty miles and an area map scale of one inch to five miles. Table I lists the nine regions of the United States.

TABLE I

| Region 1: | Pacific Northwest |
| Region 2: | Mountain |
| Region 3: | North Central |
| Region 4: | Great Lakes |
| Region 5: | Northeast |
| Region 6: | Pacific Southwest |
| Region 7: | Four Corners |
| Region 8: | South Central |
| Region 9: | Southeast |

Area pages following each regional section provide close-up views of selected metropolitan areas, and show an entire street network. For example, San Jose, Calif., is shown on a page identified "R6 263" for region six, area page 263. On that page in the atlas, grid coordinates are provided A-L left to right, and 1-11 top to bottom. The San Jose International Airport (SJC) can be seen as being located in grid J5, area page 263, R6. This could alternatively be expressed as "R6,263,J5".

Each page and grid location can be sub-divided into nine equal sub-grids, such as in Table II. This allows for greater resolution in pinpointing a given location. In the example, SJC is located in sub-grid "UR", making it, "R6,263,J5, UR".

TABLE II

| UL | UC | UR |
|----|----|----|
| ML | MC | MR |
| LL | LC | LR |

The abbreviations used for the nine equal sub-grids are expanded in Table III.

TABLE III

| UL | Upper Left |
|----|------------|
| UC | Upper Center |
| UR | Upper Right |
| ML | Middle Left |
| MC | Middle Center |
| MR | Middle Right |
| LL | Lower Left |
| LC | Lower Center |
| LR | Lower Right |

Given the prior art, it would be difficult to find one's position using such an atlas, given only longitude-latitude information, such as is provided by a conventional GPS receiver. A GPS receiver that would display TGL information directly for a user's position would be more useful.

GPS receivers conventionally provide for input of a series of waypoints on a path to a goal destination. Off-track information is typically provided real time to inform a user how far off, left or right, the actual track is off from the ideal track. Such information is not very useful to hikers who are more concerned with what their heading should be, with regard to where they are presently. A target tracking display on a GPS receiver is needed to show users their current position, relative to their goal destination. A distance and speed indication would also be useful.

SUMMARY OF THE PRESENT INVENTION

It is therefore an object of the present invention to provide a GPS receiver with a display of a user's position expressed by ruler dimensions on a uniquely identified USGS topographical map.

It is another object of the present invention to provide a GPS receiver that includes a database of map sheets uniquely identified by common-usage published names.

Briefly, an embodiment of the present invention comprises a GPS receiver for determining a user's position in terms of latitude and longitude, a database that indexes approximately 53,000 USGS 7.5 minute series topographical quadrangle maps by the latitude and longitude of at least one point on each map, and an interpreter and display that communicates the particular USGS map that represents the user's position together with the ruler dimensions left/right/up/down from a reference point on that map which pinpoints the user's position on the map. The database is stored in the permanent memory of the GPS receiver and the interpreter and display are controlled by a microcomputer included in the GPS receiver. The reference points include sixteen intersections on the map of 2.5 minute intervals of latitude and longitude contained in each 7.5 minute series quadrangle.

An advantage of the present invention is that a GPS receiver is provided that assists a user in finding a position in terms of a common map coordinate system.

Another advantage of the present invention is that a GPS receiver is provided that indicates in real time the direction a user should proceed to reach a goal destination, rather than how far off an ideal track that one is at any one point.

These and other objects and advantages of the present invention will no doubt become obvious to those of ordinary skill in the art after having read the following detailed description of the preferred embodiment which is illustrated in the drawing figures.

IN THE DRAWINGS

FIG. 2 is a representation of a typical printed map sheet referenced in the system of FIG. 1;

FIG. 8 is a flowchart diagram of a computer-implemented method of Maidenhead map conversion included in the GPS receiver of FIG. 4;

FIG. 9 is a diagram of waypoints and target tracks from a current user position;

FIG. 10 is a flowchart diagram of a computer-implemented method target tracking as in FIG. 9 and included in the GPS receiver of FIG. 4.

DETAILED DESCRIPTION OFT HE PREFERRED EMBODIMENT

Figures 1, 3:
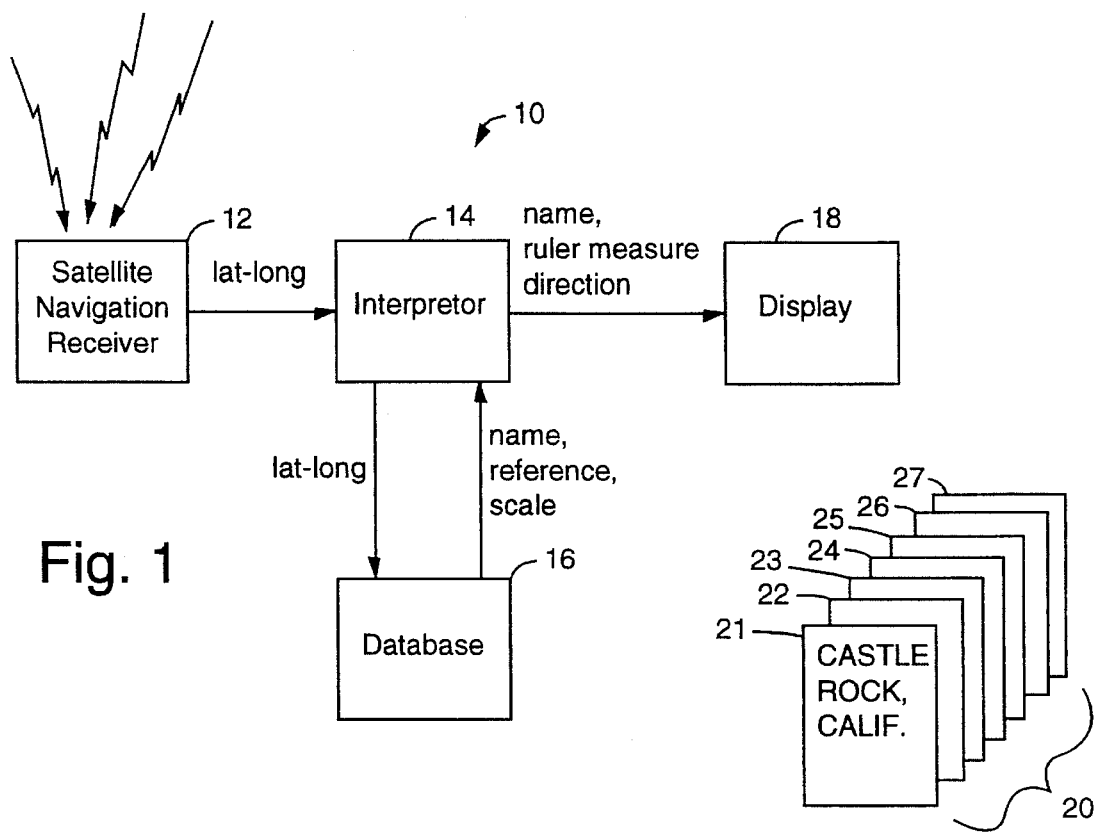
FIG. 1 is a map reading system embodiment of the present invention.
FIG. 3 is a diagram of the data structure of the database included in the map reading system of FIG. 1.

FIG. 1 illustrates a map reading system embodiment of the present invention, referred to herein by the general reference numeral 10. The map reading system 10 comprises a satellite navigation receiver 12, an earth coordinate to map coordinate interpreter 14, a database 16 of published map sheet names and scales indexed by earth coordinate points represented on individual ones of the map sheets, and a user display 18. A collection of printed maps 20 includes a plurality of individual printed map sheets 21–27 that are identified by users with a unique name, e.g., "Castle Rock Ridge", and the state, e.g., "California", such as for printed map sheet 21. For example, the collection of printed maps 20 may include the 7.5 minute series topographical maps that divide the Continental United States into 53,000 quadrangles of 7.5 minutes longitude and 7.5 minutes latitude, as published by the United States Geological Survey (USGS) (Denver, Colo.). The map reading system 10 and the printed maps 20 are preferably used together, but each are separately useful.

FIG. 2 illustrates the printed map sheet 21 in greater detail, and continues the USGS example. A southeast corner 30 of printed map sheet 21 is identified by the USGS as representing an earth coordinate position of 37°07'30" north latitude and 122°00' west longitude. A northwest corner 31 represents 37°15' north latitude and 122°07'30" west longitude. Boulder Creek, Calif., at a southwest corner 32, which represents a position of 37°07'30" north latitude and 122°07'30" west longitude. Saratoga, Calif., lies near a northeast corner 33, which represents 37°15' north latitude and 122°00' west longitude. Map sheet 21 further shows 2'30" divisions of latitude and longitude, which divide each quadrangle map sheet into a set of nine parts 34–42, a matrix three-by-three. There are sixteen intersections of the 2'30" divisions of latitude and longitude which include points 30–33, and a set of twelve more points 43–54. The scale of the printed map sheet 21 is identified by a label 56 as being 1:24,000, meaning one inch on the map represents 24,000 inches on land, or 2,000 feet. The unique name of the map, together with the state and series, is identified by a label 58. The source of the printed maps 20 is identified by a label 60.

FIG. 3 shows that the database 16 comprises information from the printed maps 20 related by individual map sheets 21–27 according to their respective names from the label 58, the earth coordinates of at least one of the points 30–33 and 43–54, and the scale information from the label 56. Preferably, each relational instance in the database 16 includes the earth coordinates for all of the points 30–33 and 43–54. Any earth coordinate provided by the satellite navigation receiver 12 that includes or lies between 122°07'30" and 122°00' west longitude, and that includes or lies between 37°15' and 37°07'30" north latitude, will index in the database 16 by the interpreter 14 and provide a reference to the printed map sheet 21 by its name. Other latitudes and/or other longitudes will result in references to the other printed map sheets 22–27. In fact, with the USGS series, 53,000 other map sheets may be referenced. The database storage requirement for such an example, is estimated to be eight megabytes of read only memory for the database 16 alone. Data compression techniques can be used with an estimated benefit of a 50% storage space reduction.

The satellite navigation receiver 12 preferably comprises a GPS receiver, such as is marketed by Trimble Navigation Ltd., (Sunnyvale, Calif.) under the trademarks SCOUT and SCOUTMASTER. Each orbiting GPS satellite transmits a pair of L-band microwave radio frequency carrier signals, including an L1 signal having a frequency of 1575.42 MHz (also referred to as 1540 $f_0$, where $f_0$ is 1.023 MHz), and an L2 signal having a frequency of 1227.6 MHz (1200 $f_0$). The L1 and L2 signals are biphase modulated by pseudo-random noise (PRN) codes. The PRN codes facilitate multiple access. Since each satellite uses different PRN codes, a signal transmitted by a particular satellite can be selected by generating and matching (correlating) the corresponding PRN code pattern. Additionally, the PRN codes facilitate signal transmit time measurements which can be made by measuring the phase shift required to match the code. Both of the carrier signals (L1 and L2) are modulated by a PRN code which is referred to as a precision (p) code. The p-PRN code, which is intended for military purposes, is a relatively long, fine-grained, precision code having a clock rate of 10.23 MHz (10 $f_0$).

The L1 carrier signal is additionally modulated by a PRN code which is referred to as a clear/acquisition (C/A) code. The C/A PRN code, which is intended for rapid signal acquisition and for commercial purposes, is a relatively short, coarse grained code having a clock rate of 1.023 MHz ($f_0$) and a code length of 1023 bits (one millisecond). A full bit (chip) of C/A PRN code, phase delay corresponds to a distance of 293 meters. In addition to the PRN codes, both of the signals (L1 and L2) are, continuously, biphase modulated by a 50 bit per second, 1590 bit long, navigation data bit stream. The navigation data bit stream includes information as to the status and ephemeris of all satellites, parameters for computing the particular satellite clock, and corrections for atmospheric propagation delays.

In general, the construction of a GPS receiver is conventional. For example, Charles A. Trimble discloses in U.S. Pat. No. 4,754,465 a GPS C/A-code receiver for computing time, position, and velocity information of the receiver, and is incorporated herein as if fully set forth.

Referring to FIG. 1, the interpreter 14 receives an earth position coordinate computed by the satellite navigation receiver 12. Such coordinates are conventionally determined in "XYZ" format, and converted conventionally to the latitude-longitude coordinate style for use by navigators and surveyors, for example. In order to index the database 16, the position determined by the satellite navigation receiver 12, a position "P" is compared to each instance in the database 16 to find the one printed map sheet 21–27 that has a southeast corner, for example, that is equal to or not more than 7.5 minutes of latitude and longitude less than position "P". If the position "P" is 122°02'30"W and 37°10'N, then it is coincident with intersection 51 on the printed map sheet 21. It is then possible to compute the ruler distance on the printed map sheet 21 up and to the left of the point 30, the southeast corner reference. Given that the scale is 1:24,000, as provided by the label 56, the interpreter 14 computes that the point "P" is six and one-eighth inches to the left and seven and five-eighths inches up from the point 30. If useful, the point "P" can be computed using any reference on the printed map sheet 21 discernible to the user, for the points 31–33, 43–50 and 52–54. The unique map name, state, map reference point and ruler measurement and direction, e.g., left, right, up, and down, are sent to the display 18 to be communicated to the user.

Figure 4:
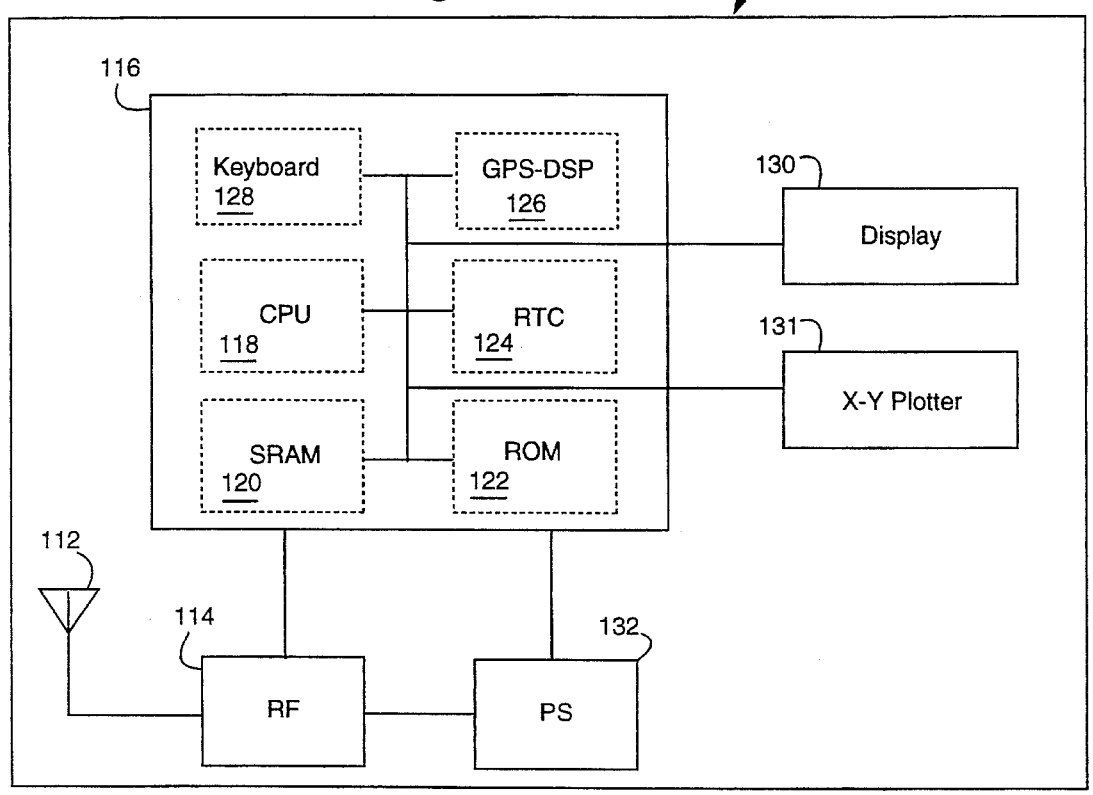
FIG. 4 is a block diagram of a GPS receiver included in the map reading system embodiment of the present invention in FIG. 1.
Figure 5:
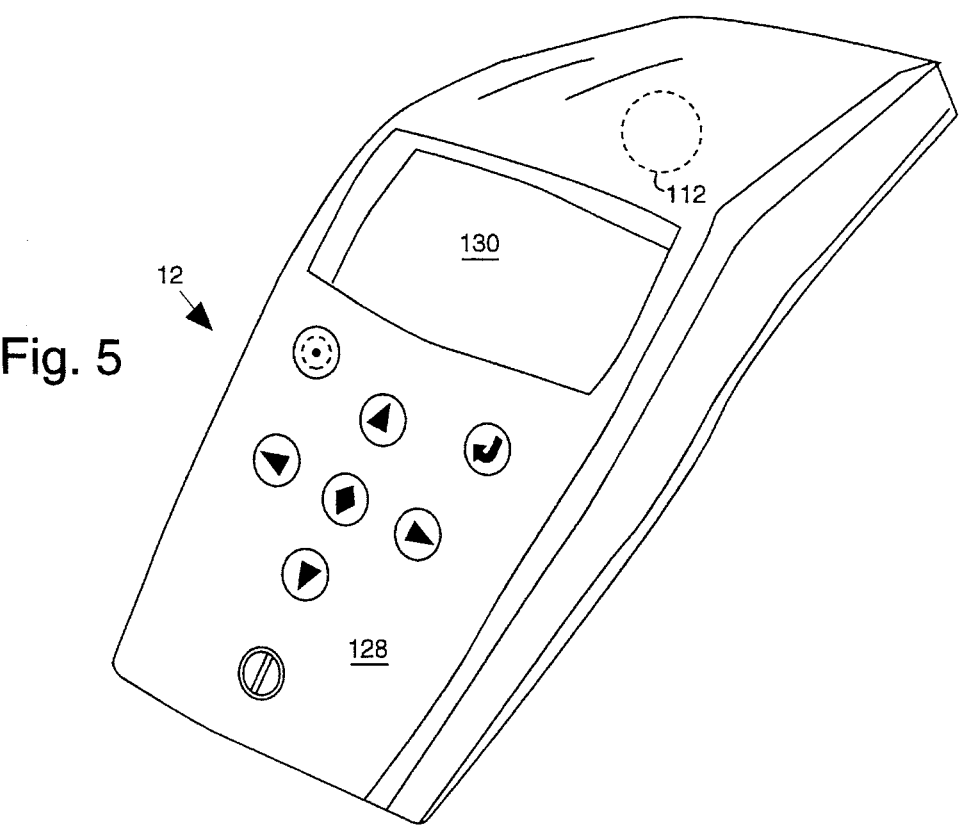
FIG. 5 is a perspective view of the GPS receiver of FIG. 1.

FIGS. 4 and 5 show the satellite navigation receiver 12 as comprising an antenna 112 to receive radio signals from orbiting GPS satellites, a radio frequency (RF) stage 114 to amplify and downconvert such GPS radio signals and a navigation computer 116. Navigation computer 116 includes a microprocessor (CPU) 118, a static random access memory (SRAM) 120, a read only memory (ROM) 122, a real time clock (RTC) 124 and a GPS digital signal processor (GPS-DSP) 126. CPU 118 is preferably a Motorola type 68000. SRAM 120 has a capacity of 64K bytes and ROM 122 stores eight megabytes.

In FIG. 4, ROM 122 has machine code programmed into it that embodies an operating system to communicate with a keyboard 128 and a display 130 for interaction with a user. An X-Y chart recorder 131 is alternatively connected to the navigation computer 116 and provides for a hard copy printout of a path traveled by the satellite navigation receiver 12 over a period on time. A power supply (PS) 132 powers satellite navigation receiver 12 and may include a battery for portable use and an adapter, e.g., a cigarette lighter adapter for use in an automobile.

The operating system causes RF 114 to tune to selected orbiting navigation satellites, e.g., GPS satellites, and to direct CPU 118 to demodulate their respective signals to obtain range information. GPS-DSP 126 is controlled to produce navigation fixes each second in an X,Y,Z coordinate system that is aligned to the earth at the equator, poles and Greenwich, England (prime meridian). Such computations of X,Y,Z and the hardware to support them are conventional and may be obtained commercially, for example the GPS receivers marketed as SCOUT and SCOUT MASTER by Trimble Navigation (Sunnyvale, Calif.) may be used.

Figure 6:
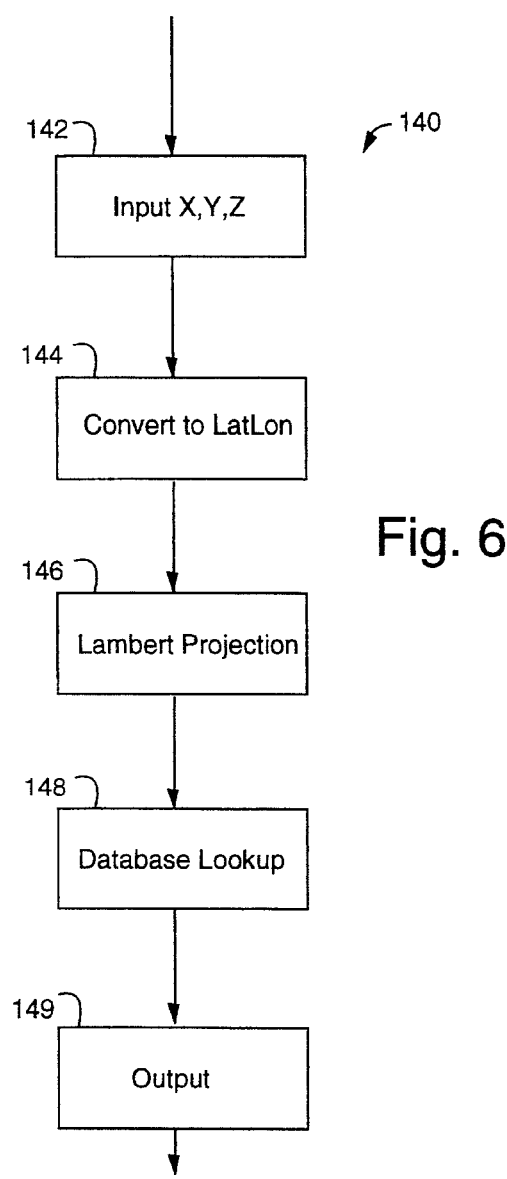
FIG. 6 is a flowchart diagram of a computer-implemented method of atlas map conversion included in the GPS receiver of FIG. 4.

ROM 122 further includes an application program 140, diagrammed in FIG. 6, that converts the X,Y,Z coordinate information to one or more different coordinate styles in real time each second, or on demand. These coordinate styles include the ordinate system of Great Britain (OSGB), universal transverse mercader (UTM), Thomas Brothers map page and grid, Trimble Atlas, and topographical map "over and up" where map scales and datums may be input at keyboard 128. The coordinate styles may be selected by a user through keyboard 128 and are output on display 130.

Application program 140 may include a computer-implemented method that uses the Thomas Brothers map coordinate style for an output to display 130. A step 142 inputs an X,Y,Z position update every second from GPS-DSP 126. A step 144 converts the X,Y,Z data into standard latitude-longitude (LatLon) coordinates. A step 146 does a Lambert conformal projection to project the three-dimensional X,Y,Z and LatLon information into two-dimensional X,Y information because maps are flat, single plane approximations of the earth's contour. ROM 122 stores a database that correlates X,Y information to particular regional map pages, area map pages and detail map pages in the Thomas Brothers map atlases. Such a database may be manually assembled by deriving positional information from each page of a published Thomas Brothers map, or the data may be supplied by Thomas Brothers Maps (Irvine, Calif.) under a proprietary license arrangement. The database is indexed in a lookup action in a step 148. A map page and grid representation is output on display 130 in a step 149.

Figure 7:
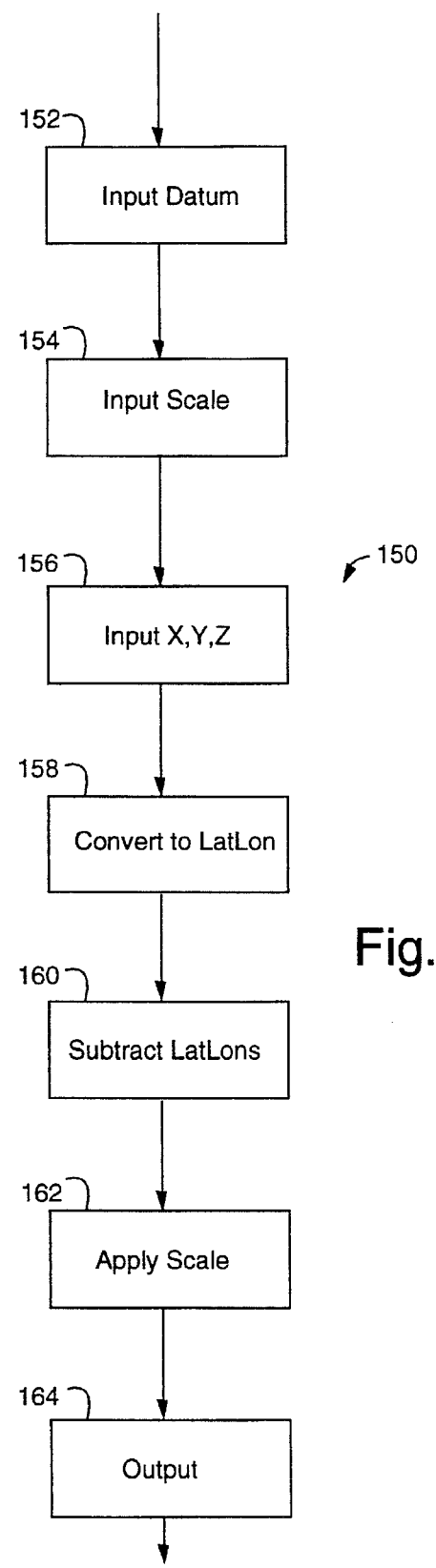
FIG. 7 is a flowchart diagram of a computer-implemented method for "over and up" map conversion for the GPS receiver of FIG. 4.

The application program 140, of FIG. 6, may also include a computer-implemented method 150, shown in FIG. 7, that allows a map's south-east corner datum to be entered together with scale information. This provides an output to display 130 that shows the distance, e.g., inches or centimeters, "over and up" from the datum that a user is located on the map page.

As illustrated in FIG. 7, a step 152 inputs a datum from a user through keyboard 128 in latitude and longitude terms that represent the south-east corner of the corresponding map page, e.g., as $LatLon_{datum}$. For example, the United States Geological Survey (USGS) publishes such maps with latitude and longitude provided for a bottom right-hand corner datum. A step 154 inputs a map scale from a user through keyboard 128 in terms of map centimeters to actual meters or kilometers. A step 156 inputs an X,Y,Z position update every second from GPS-DSP 126. A step 158 converts the X,Y,Z data into standard latitude-longitude (LatLon) coordinates, e.g., as $LatLon_{fix}$. A step 160 subtracts $LatLon_{datum}$ from $LatLon_{fix}$, which yields a difference in degrees latitude and in degrees longitude. In a step 162, the distance on the earth's surface represented by the degrees of latitude and the degrees of longitude at the position fix are divided by the scale factor that was input in step 154. An indication to a user is output in a step 164 to display 130 informing the user how many inches or centimeters the user's position is on the map entered from the datum provided.

The application program 140 may further include a computer-implemented method 170, shown in FIG. 8, that uses the Maidenhead coordinate style for an output to display 130. A step 172 inputs an X,Y,Z position update every second from GPS-DSP 126. A step 174 converts the X,Y,Z data into standard latitude-longitude (LatLon) coordinates. A step 176 projects the three-dimensional X,Y,Z and LatLon information into two-dimensional Maidenhead grid system information. ROM 122 stores a database that correlates X,Y and LatLon information to particular Maidenhead grid locations. Such a database may be manually assembled by deriving positional information from each grid. The database is indexed in a lookup action in a step 178. A Maidenhead position representation is output on display 130 in a step 180 that represents the current position of satellite navigation receiver 12 and the user holding it.

Application program 140 may further include a computer-implemented method for target tracking goals and waypoints. FIG. 9 illustrates a current user's true position 182. A track 184 indicates the path to a waypoint 186. Satellite navigation receiver 12 displays direction orientation signals, e.g., "left", "right" or "turnaround" indications on display 130 to guide a user directly to waypoint 186, regardless of whether the users subsequent positions deviate from track 184. Prior art devices generally guide a user back to track 184, rather than waypoint 186. At anytime, satellite navigation receiver 12 can be set to operate with a next waypoint 188, by an entry at keyboard 128. In that case, display 130 will provide left, right and turnaround information relative to a track 190. Similarly, a still further waypoint 192 may be targeted by using a track 194. Waypoint 186, for example, does not have to be passed by the user from point 182 before waypoints 188 and 192 can be used. Conversely, a user may back track between waypoints and reverse course completely.

FIG. 10 illustrates a computer-implemented target tracking program 200 that may be included in application 140 to provide the way pointing and tracking described in connection with FIG. 9. A step 202 accepts waypoint information from a user through keyboard 128, e.g., in latitude-longitude, as a plurality of $LatLon_{waypoints}$. A step 204 inputs an X,Y,Z position update every second from GPS-DSP 126. A step 206 converts the X,Y,Z data into standard latitude-longitude (LatLon) coordinates, e.g., as $LatLon_{fix}$. A step 208 computes a user heading (vector) from a history of $LatLon_{fix}$ determinations. A memory can be used to store such a history, e.g., SRAM 120 (FIG. 1). A step 210 inputs a user select of which waypoint is to be used as a goal from keyboard 128 and is termed $LatLon_{goal}$. A step 212 computes a vector to $LatLon_{goal}$ from the current $LatLon_{fix}$ and compares this vector to the heading obtained in step 208. A step 214 outputs a "left", "right" or "turnaround" indication on display 130 according to the results obtained in step 112.

Figure 11:
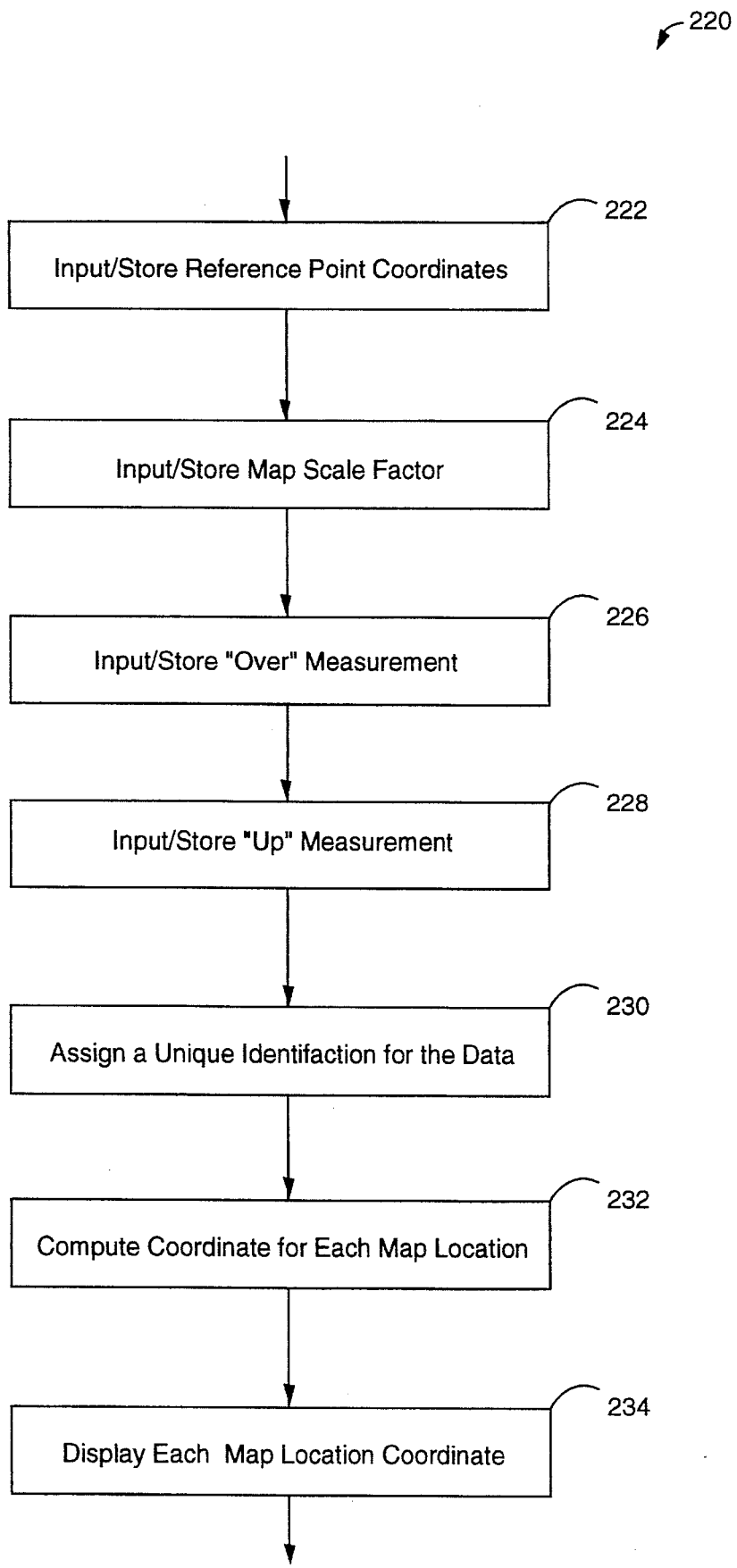
FIG. 11 is a flowchart of a method of locating a position on a map in earth coordinates by inputting data related to the map's scale and offset measurements from a datum stated in earth coordinates.

FIG. 11 illustrates a method 220, according to the present invention, for locating a position on a map in earth coordinates by inputting data related to the map's scale and offset measurements from a datum stated in earth coordinates. A GPS receiver, such as satellite navigation receiver 12 in FIG. 1, may be used in the steps of method 220, which converts map measurement units measured "over and up" from a designated map reference point (datum), into position information that is named and stored in a memory within the GPS receiver. Thereafter, various locations can be called up to the display, such as display 130, in one of several standard coordinate styles, e.g., latitude/longitude, UTM, Maidenhead, TRIMBLE GRID LOCATOR™ (Trimble Navigation, Ltd.), OSGB or coordinates used to index into Thomas Brothers Maps publications. A step 222 requests and stores a reference point into the memory of the GPS receiver. For example, many topographical maps provided by the government of the United States include a call-out of the latitude/longitude for a corner of a particular section represented in a map, e.g., the south-east corner (bottom-right). A step 224 requests and stores a map scale factor into the memory of the GPS receiver. For example, map scales of 1:20,000, 1:24,000, 1:25,000, 1:50,000, 1:62,500, 1:63,360, 1:100,000, 1:125,720, 1:150:000, and 1:500,000 may be provided on a conventional menu display, together with provisions for one or more custom scale factors. A step 226 requests and stores a horizontal measurement on the map "over" from the reference point into the memory of the GPS receiver. Such a measurement may be in inches or centimeters, for example. A step 228 requests and stores a vertical measurement on the map "up" from the reference point into the memory of the GPS receiver. Such a measurement may also be in inches or centimeters. A step 230 assigns a unique name and/or number to identify the newly created "over and up" location so that it may be distinguished from subsequent entries. A step 232 computes the respective locations for corresponding reference points, map scales and over and up measurements for expression in a standard coordinate style for a user. A step 234 outputs to a display for the user each "over and up" map location in a selected coordinate style with its unique identifying name and/or number.

The database 16 (FIG. 1) is preferably included in the ROM 122 (FIG. 4). The display 130 (FIGS. 4 and 5) is preferably used also for the display 18 (FIG. 1). The interpreter 14 (FIG. 1) is preferably implemented as a computer program which runs on the CPU 118 (FIG. 4).

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A satellite navigation map reading system, comprising:
   a navigation satellite receiver for receiving microwave radio transmission signals from orbiting global positioning system (GPS) satellites and for converting a plurality of said signals into a determination of an earth position of the receiver and including means for computing said earth coordinate positions in terms of latitude and longitude;
   a database of unique map names and each map's relation to a map coordinate earth position which is represented on a published, printed map and that is identified by one of said map names, and a scale of said published, printed map, wherein, the database includes the names, scales and included latitude and longitude reference points for the 7.5 minute series topographical maps published by the United States Geological Survey (USGS);
   interpretation means connected to the navigation satellite receiver and the database for converting said determination of an earth position of the receiver into one of said map names by indexing the database to find which of said published, printed maps includes a coordinate of said determined earth position of the receiver;
   a display connected to the interpretation means for visually communicating the unique identity of said one said published, printed map; and
   ruler measurement means connected to the interpretation means and the display for indicating to a user a ruler distance on a sheet of said published, printed map that said earth position of the receiver is represented up or down, then left or right from a reference point on said published, printed map.

2. A navigation system for displaying to a user where the user's position is determined to be on a printed map sheet, the system comprising:
   a satellite navigation receiver with means for receiving a plurality of radio transmissions from orbiting navigation satellites and means for converting said signals to a position determination;
   a plurality of printed maps having a single minute-interval and scale in latitude and longitude and each with a unique identifying name and at least one reference point;
   a database that relates only each said name to said corresponding reference point for each of the printed maps; and
   conversion means connected to the satellite navigation receiver and the database for naming which one of the plurality of printed maps includes a location point that represents said position determination and that further includes means for calculating the vertical and horizontal ruler measure from said reference point depending only on said uniform scale and apart from particular information about any one particular map other than the coordinates of said reference point.

3. A method of identifying a user's position on a published map that includes a unique identifying name for each sheet of the map, a scale, and at least one reference point expressed on the map in latitude and longitude, the method comprising:
   receiving a latitude and longitude output of a satellite navigation receiver that represents the earth coordinate position of a user;
   indexing a database comprised only of the unique names of published, printed maps by their identifying names which are related to a single respective scale factor and at least one reference coordinate point represented on said map;
   converting an offset of said position of said user from said reference coordinate map obtained from said database with said scale factor to a ruler measure corresponding to a point represented on said map; and
   communicating said position of said user to said user through a visual display of the ruler measure distance on said map that said user position is left, right, up and/or down from said reference coordinate point.

4. An improved position information system (10) including a navigation satellite receiver (12, 14) for determining earth coordinate information from signals received from orbiting navigation satellites, and connected to a memory (122) with map information and a user display, the improvement comprising:
   a database of information (16) permanently stored in said memory that relates by name a plurality of uniquely named minute-interval topographic maps (21–27) all sharing a single minute-interval and scale to at least one reference point representing the same corner in each corresponding topographic map;
   common corner reference point differencing means (140) for determining a vertical and horizontal ruler measure (162) consistent with said single scale after subtracting (160) an earth coordinate determined by said navigation satellite receiver from an adjacent one of said minute intervals; and
   indexing means (150) for simultaneously displaying (164) with said display a particular one of said unique names of said uniquely named minute-interval topographic maps together with said vertical and horizontal ruler measure determined by the common corner reference point differencing means.

5. The system of claim 4, wherein:

said navigation satellite receiver further comprises a global positioning system (GPS) receiver for determining a user's position in terms of latitude and longitude;

said database indexes approximately 53,000 United States Geological Survey (USGS) 7.5 minute series topographical quadrangle maps by the latitude and longitude of at least one point on each map; and the indexing means includes an interpreter and display that communicate a particular USGS map that represents the user's position together with the ruler dimensions left/right/up/down from a reference point on that map which pinpoints the user's position on the map.

6. The system of claim 4, further comprising:

means (220) for locating a position on a map in earth coordinates by inputting data related to the map's scale and offset measurements from a datum, stated in earth coordinates, using said satellite navigation receiver (12) to convert map measurement units measured "over and up" from a designated map reference point (datum), into position information that is named and stored in said memory (122), wherein thereafter a series of various locations can be called up to said display (130) in one of several standard coordinate styles, and further includes means (222) for requesting and storing a reference point into said memory (122) and means (224) for requesting and storing a map scale factor into said memory (122), and means (226) for requesting and storing a horizontal measurement on said map "over" from said reference point into said memory (122), and means (228) for requesting and storing a vertical measurement on said map "up" from said reference point into said memory (122).

7. The system of claim 6, further comprising:

means (230) for assigning a unique name and/or number to identify a newly created "over and up" location so that it may be distinguished from subsequent entries, and means (232) for computing respective locations for corresponding reference points, map scales and over and up measurements for expression in a standard coordinate style for a user, and means (234) for outputting to said display (130) each "over and up" map location in a selected coordinate style with its unique identifying name and/or number.

* * * * *